United States Patent [19]
Kim, II

[11] Patent Number: 5,662,942
[45] Date of Patent: Sep. 2, 1997

[54] KIT FOR OBTAINING FINGERPRINT IMPRESSION AND METHOD OF USING SAME

[76] Inventor: Anthony Kim, II, 2717 Sparger Rd., Durham, N.C. 27705

[21] Appl. No.: 623,697

[22] Filed: Apr. 15, 1996

[51] Int. Cl.⁶ .................. B29C 33/40; B29C 7/02
[52] U.S. Cl. .............. 425/2; 206/229; 206/568; 264/222; 264/DIG. 30; 425/472
[58] Field of Search ............ 425/2, 472; 264/222, 264/DIG. 30; 118/31.5; 427/1; 206/223, 568, 229, 575

[56] References Cited

U.S. PATENT DOCUMENTS

| D. 263,455 | 3/1982 | Grubbs | D11/104 |
|---|---|---|---|
| 964,499 | 7/1910 | Delabarre | 164/35 |
| 1,238,789 | 9/1917 | Kralund | 164/35 |
| 2,313,807 | 3/1943 | Curry | 264/222 |
| 4,508,156 | 4/1985 | Banks et al. | 164/35 |
| 4,828,116 | 5/1989 | Garcia | 425/2 |
| 4,993,472 | 2/1991 | Culver | 164/35 |
| 5,398,812 | 3/1995 | Hwang | 206/568 |

FOREIGN PATENT DOCUMENTS 2174331  11/1986  United Kingdom ............... 264/222

*Primary Examiner*—James P. Mackey
*Attorney, Agent, or Firm*—Olive & Olive, P.A.

[57] ABSTRACT

A kit and method for easily and conveniently obtaining a fingerprint impression which is subsequently used to create an accurate three-dimensional fingerprint replication. The kit comprises at least one finger sleeve, a base material and a catalyst for forming an amount of impression material, and instructions for using the kit to obtain the fingerprint impression using the finger sleeve and the impression material. The invention also comprises a unique finger sleeve adapted for use with the kit to obtain a fingerprint impression.

7 Claims, 3 Drawing Sheets

KIT FOR OBTAINING FINGERPRINT IMPRESSION AND METHOD OF USING SAME

BACKGROUND OF THE INVENTION

1. Field of the Invention

This invention relates to a kit and method for easily and conveniently obtaining a fingerprint impression. Once the fingerprint impression is obtained, an accurate three-dimensional replication of a person's fingerprint is cast from the fingerprint impression, preferably into an ornamental jewelry piece. The invention also relates to a unique finger sleeve adapted for use with the kit for obtaining a fingerprint impression.

2. Description of the Related Art

In order to obtain an accurate three-dimensional replication of a person's fingerprint, one must first obtain an impression of the fingerprint. Once a fingerprint impression is made, a mold, for example a wax mold, is then made of the impression to obtain a positive image of the fingerprint. The mold is then used to create a metal cast of the fingerprint, for example, by the lost wax process which is well known in the art.

It is known to include fingerprint impressions in decorative jewelry pieces, and known to make pieces by the lost wax process, for example, as described in U.S. Pat. No. 964,499 of Delabarre, U.S. Pat. No. 4,993,472 of Culver, and U.S. Pat. No. D 263,455 of Grubbs.

Very few people, however, possess the knowledge, skill or equipment necessary to obtain an accurate three-dimensional replication of a fingerprint in cast metal. There is a need, therefore, to provide a kit and method to persons not skilled in the field of casting metal for obtaining a suitable and an accurate fingerprint impression which can subsequently be submitted to a skilled person for creating the cast metal replication.

Obtaining an accurate three-dimensional replication of a fingerprint can be very useful in the permanent recordation of a person's fingerprint, as well as a meaningful permanent and highly personal memento of a person. With the current frequency of child abductions, people have been encouraged to record and document the vital statistics of a child, of which the fingerprint is often the most important and reliable identifier. Even if a missing child's appearance changes, the fingerprint will remain the same, and can become the most reliable method of identifying the child.

As a meaningful personal memento, the three-dimensional replication of a fingerprint can be used to obtain an impression from an infant's finger or toe at birth, or from a deceased person, as a keepsake jewelry item.

It is therefore an advantage of this invention to provide a kit for obtaining in an easy and convenient manner a fingerprint impression.

Other advantages will be more fully apparent from the following disclosure and appended claims.

SUMMARY OF THE INVENTION

The kit and method of this invention provides for easily and conveniently obtaining a three-dimensional fingerprint impression of a person's fingerprint. The kit comprises at least one, and preferably a plurality of different size, unitary finger sleeves, generally hollow and tubular in form; a predetermined amount of base material and a predetermined amount of catalyst which when mixed together form an amount of impression material in a quantity suited to making a selected number of fingerprint impressions; and instructions for obtaining a fingerprint impression using the finger sleeve and the impression material. The unique finger sleeve of the invention has at a proximal end a first opening sized to receive substantially snugly a person's finger of comparable size and permitting the distal end of the finger to extend through the sleeve, a second opening being oval shaped and formed in a side portion of the sleeve and being sized and shaped to permit the fingerprint of the finger to be exposed through the second opening, and a third opening formed partially in a distal end and partially in a distal side portion of the sleeve on a side opposite of the second opening and being sized and shaped to permit the outermost extremity and fingernail portion of the finger to extend outwardly of the sleeve when the fingerprint is exposed in the second opening.

The invention also relates to a method for utilizing the kit to obtain a fingerprint impression, comprising the steps of: forming a unitary finger sleeve of the type described above; placing the finger sleeve on the finger from which the fingerprint impression will be obtained; preparing the impression material by kneading together a predetermined amount of base material with a predetermined amount of catalyst; placing the prepared impression material over the fingerprint exposed by the finger sleeve; exerting pressure on the impression material over the fingerprint beginning at the center of the fingerprint and working toward the exterior of the fingerprint; allowing the impression material to remain on the finger tip for a time sufficient to permit the impression material to set; removing the impression material from the finger; and removing the finger sleeve from the finger.

In an alternative embodiment of the kit and method, a dispenser gun and cartridge containing the impression material in unmixed form are provided and utilized to prepare and apply the impression material to a fingerprint and to obtain the fingerprint impression.

Other aspects and features of the invention will be more fully apparent from the following disclosure and appended claims.

DETAILED DESCRIPTION OF THE INVENTION AND PREFERRED EMBODIMENTS THEREOF

Figure 1:
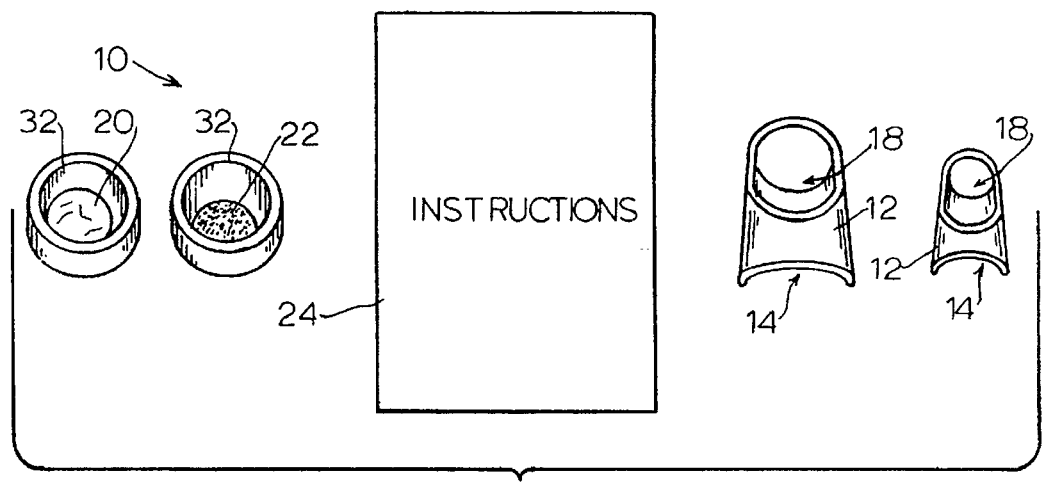
FIG. 1 is a top plan view of a kit of components suited for obtaining a fingerprint impression according to the invention and including finger sleeves of various sizes.

Referring to the drawings, like elements of the kit are represented by the same numeral references, and show a kit and method for easily and conveniently obtaining a three-dimensional fingerprint impression according to the present invention. Although the description is directed to obtaining a fingerprint impression, it is understood that the invention is equally suited for obtaining other impressions, for example, a person's toe print impression.

Figure 4:
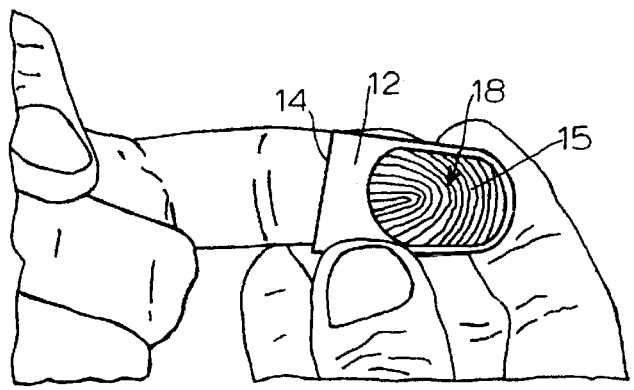
FIG. 4 is a perspective view showing the finger sleeve of FIGS. 2 and 3 being placed on a finger.
Figure 7:
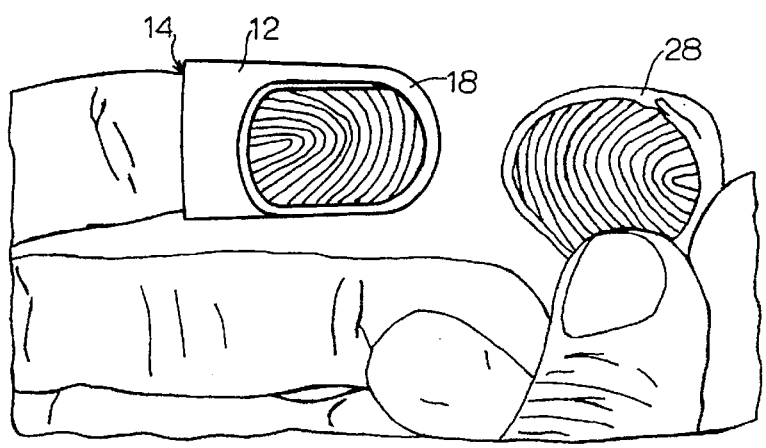
FIG. 7 is a perspective view showing a typical fingerprint impression obtained in the impression material.

Kit 10 comprises at least one, and preferably a plurality of different size, unitary finger sleeves 12, base material 20, catalyst 22, containers 32 and instructions 24. As discussed more fully below, kit 10 is utilized to obtain fingerprint impression 28 (FIG. 7) of a person's fingerprint 15 (FIG. 4).

Figure 2:
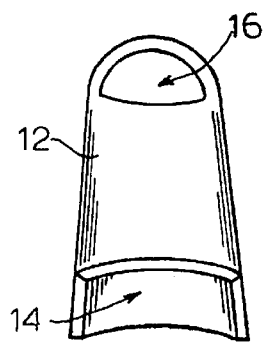
FIG. 2 is a bottom view of one of the finger sleeves shown in FIG. 1.
Figure 3:
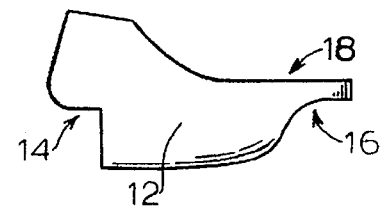
FIG. 3 is a right side view of the finger sleeve of FIG. 1.

Kit 10 contains at least one unitary finger sleeve 12 for positioning on a person's finger tip to expose the fingerprint. A plurality of different size finger sleeves 12 are preferably provided in kit 10, and are suitable for use on different size finger tips, for example, sized for adults and children. Unitary finger Sleeve 12, as shown in FIGS. 1, 2 and 3, is preferably generally hollow and tubular in form and is substantially rigid. Finger sleeve 12 has at a proximal end first opening 14 sized to receive substantially snugly a person's finger of comparable size and permitting the distal end of the finger to extend through sleeve 12; second opening 18 being oval shaped and formed in a side portion of sleeve 12 and being sized and shaped to permit fingerprint 15 to be exposed through second opening 18 (FIG. 4); and third opening 16 formed partially in a distal end and partially in a distal side portion of sleeve 12 on a side opposite of second opening 18, and being sized and shaped to permit the outermost extremity and fingernail portion of the finger to extend outwardly of sleeve 12 when fingerprint 15 is exposed in second opening 18. While it is possible to obtain fingerprint impression 28 without the use of sleeve 12, use of sleeve 12 enables one to obtain a more defined and accurate fingerprint impression 28 because the area of print 15 is limited and defined by second opening 18.

A predetermined amount of base material 20 and a predetermined amount of catalyst 22 are provided in kit 10 and are stored in containers 32, which are preferably air tight for preserving base material 20 and catalyst 22. Base material 20 and catalyst 22 are mixed to form impression material 26 (FIG. 4). Typically, to form impression material 26, an amount of base material 20 is kneaded together with an equal amount of catalyst 22, in a one-to-one ratio. The predetermined amount of base material 20 and catalyst 22 in kit 10 is suitable to obtain, for example, one fingerprint impression.

A suitable compound for creating impression material 26 is the type used by dentists to make dental impressions and by persons in the movie and theatrical industries. A suitable compound for impression material 26 is a polysulfide base material of the type currently available from GC American Inc. of Chicago, Ill. under the tradename COE-FLEX. It has been discovered that the most suitable compound from which impression material 26 is formed is preferably a vinyl polysiloxane material. Suitable types of vinyl polysiloxane impression material are available from Coltene AG of Altstatten, Switzerland under the tradename PRESIDENT putty, and from GC America Inc. under the tradename EXAFLEX. The most preferable material has been discovered to be that available from 3M Dental Products of St. Paul, Minn. under the trade name 3M EXPRESS STD Vinyl Polysiloxane Impression Material Putty. Impression material 26 enables one to obtain a highly accurate impression of fingerprint 15, which includes the fingerprint ridges as well as the finger's sweat pores. The shrinkage of impressions formed from this type of material during curing is very low, in some cases 0.2% of 1%. Additionally, one does not have to press down very firmly on the fingerprint to obtain an accurate fingerprint impression 28 in the impression material. Therefore, distortion to the fingerprint is minimal as a result of pressure on the fingerprint.

Kit 10 also contains instructions 24 which describe the contents of kit 10 and the method of using kit 10 to obtain fingerprint impression 28. Instructions 24 also indicate to whom and to what address one should forward fingerprint impression 28 to obtain the three-dimensional fingerprint replication.

Figure 5:
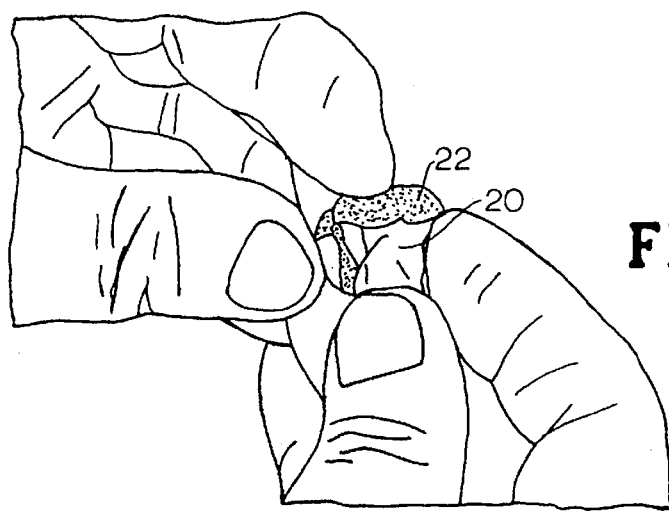
FIG. 5 is a perspective view illustrating mixing of a base material and catalyst contained in the kit to form impression material to obtain a fingerprint impression.
Figure 6:
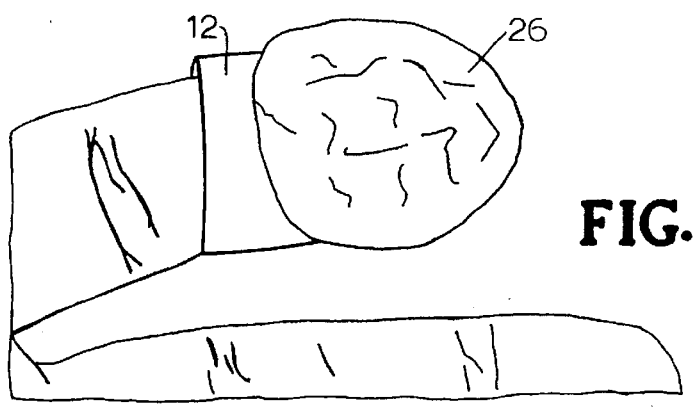
FIG. 6 is a perspective view illustrating the impression material being pressed on a portion of a finger exposed through a finger sleeve.

In using kit 10 to obtain a fingerprint impression 28, as shown in FIGS. 4 through 7, a finger sleeve 12 of the type previously described is formed. Finger sleeve 12 is placed on the person's fingertip through first opening 14; the finger extends through sleeve 12 and out of third opening 16. Second opening 18 is oval-shaped and surrounds and exposes fingerprint 15 (FIG. 4). Next, a predetermined amount of base material 20 is mixed with a predetermined amount of catalyst 22 by kneading, as illustrated in FIG. 5. Base materials 20 and catalyst 22 are kneaded together until such time as a uniform color is achieved, which typically requires approximately 20–30 seconds. Kneading for a period of up to approximately 45 seconds, however, can cause base material 20 and catalyst 22 to begin to set in the kneaded ball form. Once base material 20 and catalyst 22 are mixed, impression material 26 is formed. Impression material 26 is then placed over fingerprint 15 and second opening 18, as seen in FIG. 6. Impression material 26 is pressed onto fingerprint 15, preferably from the center of fingerprint 15 toward the exterior of fingerprint 15 to prevent air bubbles from forming between fingerprint 15 and impression material 26, and to ensure that the details of fingerprint 15 are impressed into impression material 26. The presence of air bubbles are sometimes evident in a first formed fingerprint impression 28. In such event, an application of new impression material 26 is required to obtain new fingerprint impression 28. Once pressed onto fingerprint 15, impression material 26 is permitted to set for a sufficient time on the fingerprint 15, which is typically for approximately two minutes. This setting time is to some extent dependent on body temperature and may be slightly longer, even doubled, if impression material 26 is used to obtain a fingerprint impression 28 from a deceased person, whose body temperature is typically much lower than that of a living person. In either case, once the setting time is finished, the impression material 26 will have been cured to form a fingerprint impression 28 (FIG. 7) in which the details of fingerprint 15 are resistant to being altered or damaged under normal usage. Once fingerprint impression 28 is obtained, it may be submitted to one skilled in the art for obtaining an accurate cast metal three-dimensional replication of the fingerprint according to known practices.

Replacement parts are also available for kit 10, for example, additional finger sleeves 12, additional amounts of base material 20 and catalyst 22.

Figure 8:
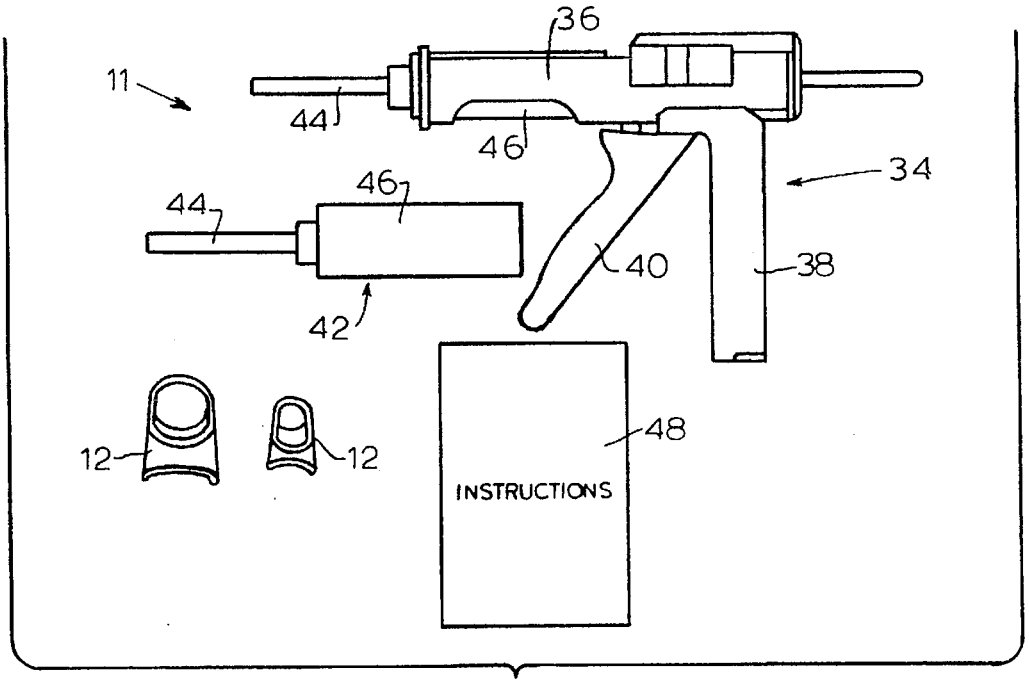
FIG. 8 is a top plan view of an alternative embodiment of the kit of the invention.
Figure 10:
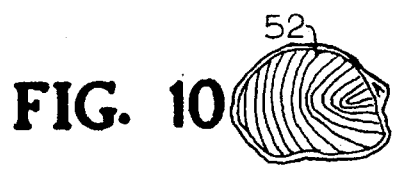
FIG. 10 is a perspective view showing a typical fingerprint impression obtained in the impression material utilizing the alternative embodiment of the invention as shown in FIGS. 8 and 9.
Figure 9:
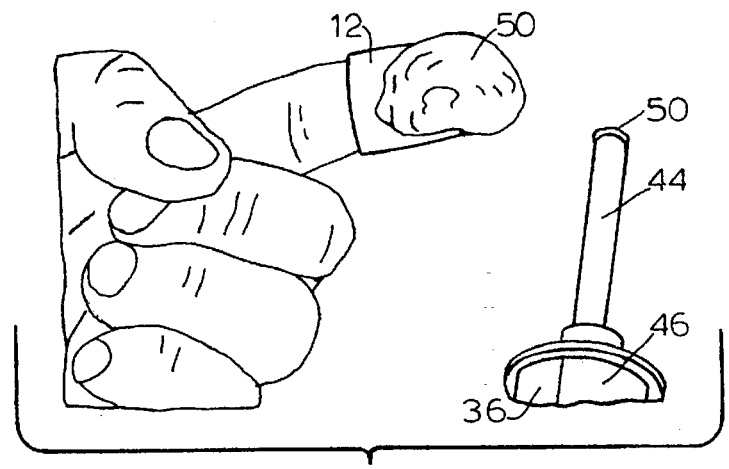
FIG. 9 is a perspective view showing how the impression material could be placed onto a finger exposed through a finger sleeve using the alternative embodiment of the kit.

In an alternative embodiment of the invention as shown in FIGS. 8 through 10, kit 11 comprises at least one, and preferably a plurality of different size, unitary finger sleeves 12, and instructions 48, and further comprises dispenser gun 34 and cartridge 42, known in the art, as shown in FIG. 8. Dispenser gun 34 and cartridge 42 in the alternative embodiment replace base material 20 and catalyst 22 provided in containers 32 as previously described for kit 10. Dispenser gun 34 and cartridge 42 are utilized to automatically mix and dispense impression material 50 onto fingerprint 15 which is exposed by second opening 18 of sleeve 12. FIG. 8 shows a cartridge 42 inserted into dispenser gun 34, and a cartridge 42 standing alone. Dispenser gun 34 comprises cartridge chamber 36 into which cartridge 42 is inserted, and handle 38 and trigger 40. Cartridge 42 comprises replaceable mixing stem 44 and cylinder 46. Cylinder 46 contains a predetermined mount of base material (not shown) and a predetermined amount of catalyst (not shown) in such a manner that the two compounds are not mixed until such time as they are simultaneously dispensed from gun 34.

An advantage of providing dispenser gun 34 and cartridge 42 in kit 11 is the ability to dispense a more economical amount of impression material 50, and a more economical method of storing utilizing impression material 50. If it is anticipated that a multiple number of fingerprint impressions 50 (FIG. 10) are to be obtained, kit 11 is preferably equipped with dispenser gun 34. For example, a funeral director may wish to obtain fingerprint impressions 52 from a number of different deceased persons, whereas another individual may wish to obtain only one fingerprint impression 52, for example, of an infant's fingerprint. For the latter user, kit 10 would be more appropriate. Dispenser gun 34 provides for the automatic mixing of base and catalyst, and for the controlled release of a sufficient amount of impression material 50 suitable for obtaining fingerprint impression 52.

Additionally, cartridge 42 provides more economical way to store and dispense impression material 50. After dispensing the proper amount of impression material 50 from mixing stem 44, mixing stem 44 remains attached to cartridge 42. Impression material 50 is permitted to set in mixing stem 44. In this manner, the amount of unmixed base material (not shown) and catalyst (not shown) remains in cylinder 46 of cartridge 42, and is sealed in an airtight manner. When another application of impression material 50 is needed, new mixing stem 44 replaces old mixing stem 44 for the dispensing of newly mixed impression material 50 for use in obtaining a subsequent fingerprint impression 52. A suitable dispenser gun and cartridge system is available from Coltene/Whaledent Inc. of Mahwah, N.J. under the tradename PRESIDENT microSystem.

To dispense impression material 50 from dispenser gun 34 and cartridge 42, handle 38 and trigger 40 operate cooperatively to activate cartridge chamber 36 in such a manner so as to cause an amount of base material and an amount of catalyst to be dispensed from cylinder 46 into mixing stem 44, and then mixed in mixing stem 44. Upon further activation of trigger 40, an amount of impression material 50 is dispensed from mixing stem 44 onto fingerprint 15 exposed by second opening 18. Cartridges of the size currently available typically provide impression material 50 in an amount sufficient for approximately seven or eight fingerprint impressions 52.

As illustrated in FIG. 9, impression material 50 is dispensed onto fingerprint 15 exposed by finger sleeve 12 and is permitted to remain on the fingerprint 15 until it sets, which is typically a period of approximately two minutes. Again, this setting time may be slightly longer, even doubled, if impression material 50 is used to obtain a fingerprint impression 52 from a deceased person. Once the setting time has passed, impression material 50 will have cured to form fingerprint impression 52, as shown in FIG. 10. Fingerprint impression 52 may be utilized to obtain an accurate cast metal three-dimensional replication of the fingerprint according to known practices.

As with kit 10, kit 11 comprises instructions 48 which include a description of the kit contents, instructions for using the kit, and to whom the fingerprint impression 52 should be forwarded for obtaining the three-dimensional cast fingerprint.

While the invention has been described with reference to specific embodiments thereof, it will be appreciated that numerous variations, modifications, and embodiments are possible, and accordingly, all such variations, modifications, and embodiments are to be regarded as being within the spirit and scope of the invention.

What is claimed is:

1. A kit for easily and conveniently obtaining a fingerprint impression from a person's finger comprising:

a. at least one unitary finger sleeve generally hollow and tubular in form, the sleeve having at a proximal end a first opening sized to receive substantially snugly a person's finger of comparable size and permitting the distal end of the finger to extend through the sleeve, a second opening being oval shaped and formed in a side portion of the sleeve and being sized and shaped to permit the fingerprint of the finger to be exposed through the second opening, and a third opening formed partially in a distal end and partially in a distal side portion of the sleeve on a side opposite of the second opening and being sized and shaped to permit the outermost extremity and fingernail portion of the finger to extend outwardly of the sleeve when the fingerprint is exposed in the second opening;

b. a predetermined amount of base material and a predetermined amount of catalyst which when mixed together form impression material in a quantity suited to making a selected number of impressions; and c. instructions for obtaining a fingerprint impression using the finger sleeve and the impression material.

2. The kit of claim 1 further comprising a plurality of unitary finger sleeves of multiple sizes adapted to fit on a differently sized fingers from which the fingerprint impression will be obtained.

3. The kit of claim 1 wherein the impression material comprises a vinyl polysiloxane compound.

4. A kit for easily and conveniently obtaining a fingerprint impression from a person's finger comprising:

a. at least one unitary finger sleeve generally hollow and tubular in form, the sleeve having at a proximal end a first opening sized to receive substantially snugly a person's finger of comparable size and permitting the distal end of the finger to extend through the sleeve, a second opening being oval shaped and formed in a side portion of the sleeve and being sized and shaped to permit the fingerprint of the finger to be exposed through the second opening, and a third opening formed partially in a distal end and partially in a distal side portion of the sleeve on a side opposite of the second opening and being sized and shaped to permit the outermost extremity and fingernail portion of the finger to extend outwardly of the sleeve when the fingerprint is exposed in the second opening;

b. a dispenser gun having a handle portion comprising a handle and a trigger, and a cartridge chamber extending substantially perpendicular from the handle portion, such that the trigger and the handle operate cooperatively to activate the cartridge chamber;

c. a cartridge having a cylinder at one end and a mixing stem at an opposite end, the cylinder containing an amount of base material and an amount of catalyst, from which a portion of each is dispensed and mixed together in the mixing stem when dispensed from the cylinder by means of the activated cartridge chamber of the dispenser gun, and when so mixed, form an impression material; and c. instructions for obtaining a fingerprint impression using the finger sleeve, the dispenser gun, the cartridge, and the impression material.

5. The kit of claim 4 further comprising a plurality of unitary finger sleeves of multiple sizes adapted to fit on a differently sized fingers from which the fingerprint impression will be obtained.

6. The kit of claim 4 wherein the impression material comprises a vinyl polysiloxane compound.

7. A unitary finger sleeve, generally hollow and tubular in form, adapted for use with an appropriate impression material for easily and conveniently obtaining a fingerprint impression, the sleeve having at a proximal end a first opening sized to receive substantially snugly a person's finger of comparable size and permitting the distal end of the finger to extend through the sleeve, a second opening being oval and formed in a side portion of the sleeve and being sized and shaped to permit the fingerprint of the finger to be exposed through the second opening, and a third opening formed partially in a distal end and partially in a distal side portion of the sleeve on a side opposite of the second opening and being sized and shaped to permit the outermost extremity and fingernail portion of the finger to extend outwardly of the sleeve when the fingerprint is exposed in the second opening.

* * * * *